United States Patent
Altmayer (10) Patent No.: US 8,799,532 B2
(45) Date of Patent: Aug. 5, 2014

(54) HIGH SPEED USB HUB WITH FULL SPEED TO HIGH SPEED TRANSACTION TRANSLATOR

(75) Inventor: Terry R. Altmayer, Chandler, AZ (US)

(73) Assignee: SMSC Holdings S.A.R.L., Luxembourg (LU)

( * ) Notice: Subject to any disclaimer, the term of this patent is extended or adjusted under 35 U.S.C. 154(b) by 34 days.

(21) Appl. No.: 13/177,591

(22) Filed: Jul. 7, 2011

(65) Prior Publication Data

US 2013/0013823 A1    Jan. 10, 2013

(51) Int. Cl.
*G06F 13/00*    (2006.01)
*G06F 3/00*    (2006.01)

(52) U.S. Cl.
USPC ............................................. 710/33; 710/38

(58) Field of Classification Search
USPC ...................................................... 710/33, 38
See application file for complete search history.

(56) References Cited

U.S. PATENT DOCUMENTS

| | | |
|---|---|---|
| 5,815,167 A | 9/1998 | Muthal et al. |
| 5,953,511 A | 9/1999 | Sescila, III et al. |
| 6,145,045 A | 11/2000 | Falik et al. |
| 6,185,641 B1 | 2/2001 | Dunnihoo |
| 6,205,501 B1 | 3/2001 | Brief et al. |
| 6,279,060 B1 | 8/2001 | Luke et al. |
| 6,304,995 B1 | 10/2001 | Smith et al. |
| 6,435,904 B1 | 8/2002 | Herbst et al. |
| 6,480,927 B1 | 11/2002 | Bauman |
| 6,505,267 B2 | 1/2003 | Luke et al. |
| 6,671,765 B1 | 12/2003 | Karlsson et al. |
| 6,678,760 B2 | 1/2004 | Brief |
| 6,738,834 B1 | 5/2004 | Williams et al. |
| 6,816,929 B2 | 11/2004 | Ueda |
| 6,959,355 B2 | 10/2005 | Szabelski |
| 7,185,126 B2 | 2/2007 | Szabelski |
| 7,213,766 B2 | 5/2007 | Ryan et al. |
| 7,225,288 B2 | 5/2007 | Schulze et al. |
| 7,480,753 B2 | 1/2009 | Bohm et al. |
| 7,484,018 B2 | 1/2009 | Szabelski |
| 7,762,470 B2 | 7/2010 | Finn et al. |
| 7,788,428 B2 | 8/2010 | Melin |
| 7,996,586 B2 | 8/2011 | Liu |
| 8,135,883 B2* | 3/2012 | Monks et al. .................. 710/38 |
| 2002/0154625 A1 | 10/2002 | Ma |

(Continued)

FOREIGN PATENT DOCUMENTS

WO     2010132938     11/2010

OTHER PUBLICATIONS

VegMurugan, Packet Splitting and Reassembly, Jul. 14, 2008.*

(Continued)

*Primary Examiner* — Hyun Nam
(74) *Attorney, Agent, or Firm* — King & Spalding L.L.P.

(57) ABSTRACT

High speed USB hub with full speed to high speed transaction translator. A USB hub may include an upstream port for coupling to a host and one or more downstream ports for coupling to downstream devices. The downstream devices may operate at USB high speed. The USB hub may support hosts which operate at speeds less than high speed (e.g., full speed). Accordingly, when a host operates at a lower speed, a transaction translator may convert the communications from the host from the lower speed to the high speed. Accordingly, the downstream device may still operate at high speed even when the host operates at a lower speed.

19 Claims, 4 Drawing Sheets

(56) References Cited

U.S. PATENT DOCUMENTS

| | | |
|---|---|---|
| 2003/0110344 A1* | 6/2003 | Szczepanek et al. ......... 711/100 |
| 2004/0153597 A1 | 8/2004 | Kanai et al. |
| 2004/0225808 A1 | 11/2004 | Govindaraman |
| 2005/0235091 A1 | 10/2005 | Chen et al. |
| 2005/0278472 A1 | 12/2005 | Gierke |
| 2006/0020737 A1 | 1/2006 | Szabelski |
| 2006/0056401 A1 | 3/2006 | Bohm et al. |
| 2006/0059293 A1 | 3/2006 | Wurzburg et al. |
| 2006/0168466 A1 | 7/2006 | Choate |
| 2007/0132733 A1 | 6/2007 | Ram |
| 2008/0076301 A1 | 3/2008 | Liu |
| 2008/0320202 A1 | 12/2008 | Monks et al. |
| 2009/0199031 A1 | 8/2009 | Zhang et al. |
| 2009/0200367 A1 | 8/2009 | Arnouse |
| 2009/0248924 A1 | 10/2009 | Melin |
| 2009/0327536 A1 | 12/2009 | Solomon et al. |
| 2010/0049895 A1 | 2/2010 | Liang |
| 2010/0076616 A1 | 3/2010 | Kagan |
| 2011/0087806 A1 | 4/2011 | Mohanty et al. |
| 2011/0179201 A1* | 7/2011 | Monks et al. .................... 710/60 |
| 2011/0219272 A1* | 9/2011 | Lai et al. .......................... 714/54 |

OTHER PUBLICATIONS

Cypress Semiconductor Corporation, "TetraHub.TM. High-speed USB Hub Controller," Publication No. CY7C6540, Dec. 5, 2002, 25 pages.

Compaq, et al., "Universal Serial Bus Specification: Revision 2.0," Chapter 11: Hub Specification, Apr. 27, 2000, pp. 297-437 (Revision 2.0).

Universal Serial Bus 3.0 Specification, Revision 1.0; Nov. 12, 2008, 482 pages; Parts 1, 2, and 3.

International Search Report mailed Mar. 30, 2011 for PCT/US201 01061281.

International Written Opinion mailed Mar. 30, 2011 for PCT/US201 01061281.

PCT/US2010/61281 filed on Dec. 20, 2010, 29 pages.

* cited by examiner

HIGH SPEED USB HUB WITH FULL SPEED TO HIGH SPEED TRANSACTION TRANSLATOR

FIELD OF THE INVENTION

The present invention relates to the field of hubs, and more particularly to a universal serial bus (USB) hub including full speed to high speed transaction translators.

DESCRIPTION OF THE RELATED ART

In recent years, there has been a proliferation of universal serial bus (USB) devices. For example, many people own or purchase various portable devices such as cell phones, music players, video players, and cameras, among other devices. Accordingly, there has been pressure to increase transfer and communication speeds between USB devices, e.g., between a host, such as a computer, and USB devices. To achieve this goal, industry has adopted various USB standards (e.g., low speed, full speed, high speed, etc.). However, devices wishing to adopt these new standards also need to be compatible with previous USB standards. Accordingly, improvements in USB devices are desired.

SUMMARY OF THE INVENTION

Various embodiments are presented of a USB hub including full speed to high speed transaction translators.

Initially, a host may couple to an upstream port of a USB hub. For example, a computer system may be coupled to an external USB hub or may be coupled to a device (e.g., a portable device) which includes an embedded USB hub. The USB hub may be configured to operate with hosts that support any of various USB speeds (e.g., low speed, full speed, high speed, super speed, etc.). Additionally, the USB hub may be configured to operate with downstream devices that support various USB speeds as well; however, some of the devices may only be configured to support higher USB speeds (e.g., high speed). For example, some of the devices may be embedded devices (e.g., embedded in the USB hub or embedded in a device with the USB device) which are high speed inter-chip (HSIC) devices.

In embodiments described herein, a "first speed" and a "second speed" are used, where the second speed is faster than the first speed. The second speed may be, for example, USB high speed, and the first speed may be, for example, USB full speed, but other combinations are envisioned.

Accordingly, the method (e.g., the USB hub) may determine what communication speed the host supports (e.g., the first speed or the second speed). Where the host does not support the second speed, communications from the host may be converted from the first speed to the second speed (e.g., by a first speed to second speed transaction translator) and then provided to one or more downstream devices (e.g., via a second speed PHY). Note that a transaction translator (TT) may be comprised within the USB hub or may be outside of the USB hub, as desired. For example, the TT may be interposed between the second speed PHY and the host, or may simply convert communications from the USB hub for the downstream device when the USB hub provides first speed communications.

However, where the host supports the second speed, the communications may be passed through from the host to the downstream device at the second speed.

BRIEF DESCRIPTION OF THE DRAWINGS

A better understanding of the present invention can be obtained when the following detailed description of the preferred embodiment is considered in conjunction with the following drawings, in which.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a Flash, magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network and/or other physical transmission medium, that conveys signals such as electrical, electromagnetic, or digital signals.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Portable Device—any of various types of portable computing devices, including cell or mobile phones (including smart phones), PDAs, digital cameras, portable media players, netbooks, etc. In general, the term "portable device" can be defined to encompass devices (or combinations thereof) which include at least one processor that executes instructions from a memory medium and is easily carried (e.g., handheld) by a user.

Figure 1A:
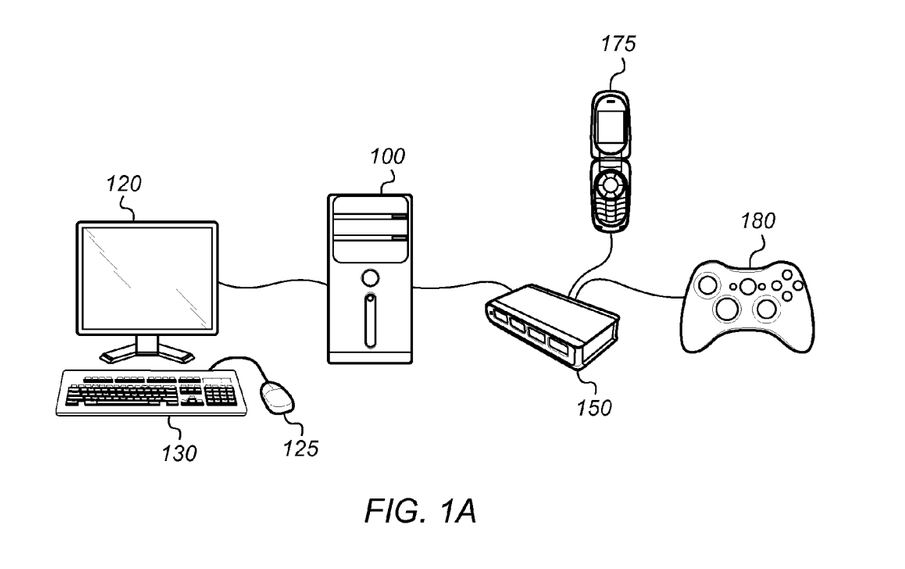
FIG. 1A illustrates an exemplary system suitable for implementing various embodiments.
Figure 1B:
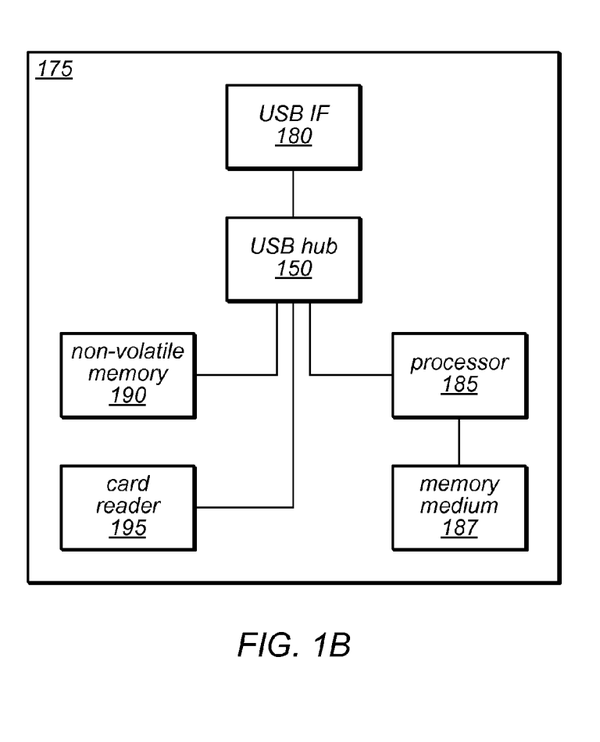
FIG. 1B illustrates a block diagram of a different exemplary system suitable for implementing various embodiments.

FIGS. 1A and 1B—Exemplary Systems

FIG. 1A illustrates one embodiment of an exemplary system including a USB hub between a host (such as a computer system) and USB devices (e.g., portable USB devices). As shown, the host 100 may be coupled to USB hub 150. As described herein, the USB hub 150 may be a USB hub that supports high speed devices with a lower speed host (e.g., a full speed host).

The USB hub 150 may be used to couple to a plurality of USB devices. For example, the devices may include portable devices, such as a cell or mobile phone (e.g., a flip phone with an LCD display, a single screen phone, such as a Blackberry™ or iPhone™, among others), a personal media player (e.g., an mp3 player, and/or an IPOD™, among other players, a CD player, a digital video player, a DVD player, etc.), a digital camera, a netbook, etc. Alternatively, or additionally, the devices may be user interface devices, such as mice, keyboards, game controllers, etc. Note that any of various USB devices are envisioned.

As shown in the exemplary embodiment of FIG. 1A, the USB hub 150 may be coupled to a first device 175 (in this case, a cell phone) and a second device 180 (in this case a game controller). However, one or more of the devices may also be included within the enclosure of the hub 150. For example, the hub 150 may include an enclosed or embedded device such as a memory medium, or a reader of external memory mediums (e.g., a card reader for memory cards, such as flash cards), which may be incorporated within the USB hub 150. As another example, the USB hub 150 may include an embedded network adapter (e.g., a USB Ethernet adapter, such as GigE). Further, the USB hub 150 may include an embedded hard drive adapter (e.g., providing a SATA connection for a hard drive).

The host 100 may include at least one memory medium on which one or more computer programs or software components may be stored. For example, the memory medium may store operating system software, as well as other software for operation of the host 100. Various embodiments further include receiving or storing instructions and/or data implemented in accordance with the foregoing description upon a carrier medium.

Note that the exemplary host 100 is shown as a computer system (e.g., as shown, with input devices 125 and 130 and display 120). However, in other embodiments, the host 100 may be a portable USB device, e.g., similar to the mobile device 175, among others. For example, in one embodiment, the host 100 may be a USB on-the-go (OTG) device which may be operable to act as a host and a device, e.g., depending on the situation. Thus, according to various embodiments the host 100 may be any of various appropriate devices.

Note further that the above descriptions of the external 100, the USB hub 150, and the devices 175 and 180 are exemplary only and other components and configurations are envisioned. Thus, FIG. 1A illustrates an exemplary system according to some embodiments.

FIG. 1B illustrates a block diagram of an alternate embodiment. In the embodiment of FIG. 1B, the USB hub 150 may be embedded within another device, such as the device 175 (or other devices, such as the display 120, the input device 130, etc.). In this embodiment, the device 175 may include a USB interface 180, which may be configured for connecting to a USB host, such as host 100. The USB interface 180 may be coupled to embedded USB hub 150. The USB hub 150 may in turn be coupled to processor 185 (coupled to memory medium 187), non-volatile memory 190 (e.g., flash memory), and/or card reader 195 (e.g., an SD card reader) via downstream ports of the USB hub 150. Thus, in the embodiment of FIG. 1B, the USB hub 150 may be embedded within another device (175) and may be coupled to other embedded devices within the device 175. Note that these embedded devices are exemplary only and any of various other embedded devices, numbers of devices, etc. are envisioned. In further embodiments, the USB hub 150 may also be configured to couple to devices external to the device 175 (e.g., via another USB interface).

In some embodiments, one or more of the embedded devices coupled to the USB hub 150 may use HSIC (high speed inter-chip) interfaces (also referred to as "may be HSIC devices"), which may allow for power savings compared to traditional USB connectivity (e.g., since HSIC is generally optimized for short trace lengths instead of long cables). The power savings can be realized in point-to-point USB connections on a board or chip, such as when the USB hub 150 and the downstream device(s) are comprised within a same device. However, according to USB specification, USB hub 150 must support low speed or full stream hosts. Additionally, HSIC is not able to function at a speed lower than high speed (e.g., full speed or low speed). Accordingly, as described herein, the hub 150 or connections to the downstream devices may be modified in order to allow communication between a lower speed host and a high speed downstream device, as discussed in more detail below.

Figure 2A:
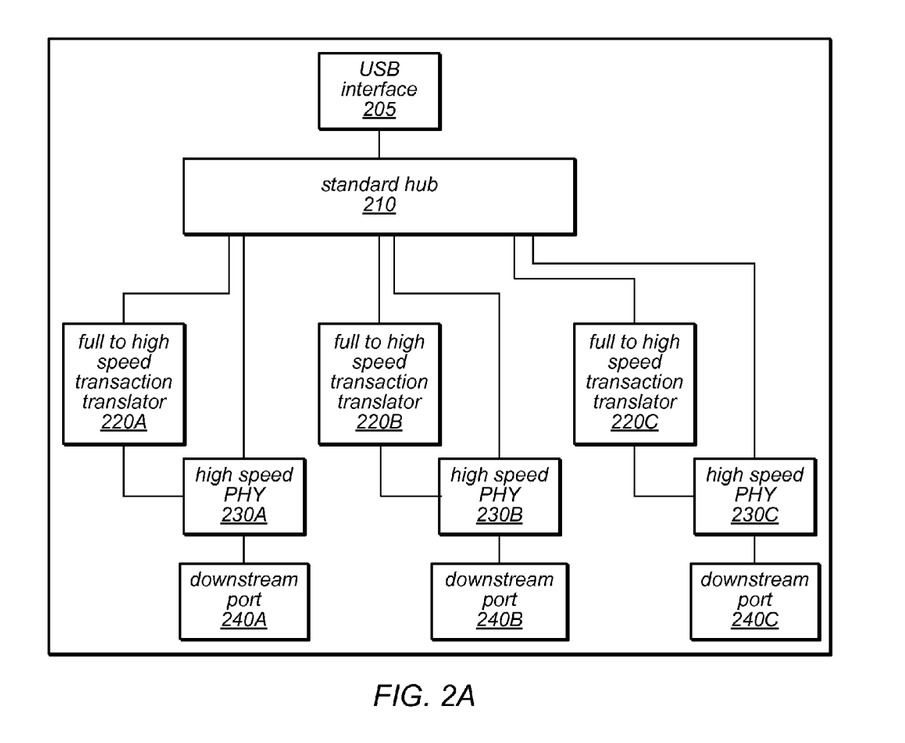
FIGS. 2A-2B are exemplary block diagrams of a USB hub, according to some embodiments.
Figure 2B:
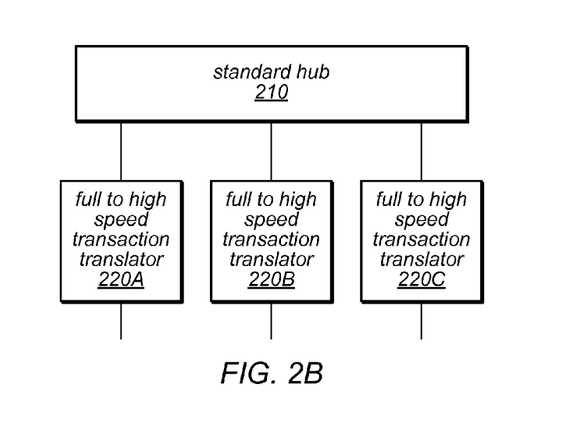

FIGS. 2A and 2B—Exemplary Block Diagrams

FIG. 2A is an exemplary block diagram of the hub 150. As shown, the hub 150 comprises or is coupled to USB interface 205, which may couple to the host 100. In the embodiment of FIG. 2A, the hub 150 may include an internal USB hub 210 (or circuitry that implements standard USB hub functionality), including an upstream port for coupling to the USB interface 205 and three downstream ports, although other numbers of upstream and downstream ports are envisioned. Each downstream port of the internal hub may be coupled to a corresponding full to high speed transaction translator (FHTT 220A-220C) and a high speed PHY (230A-230C, which each respective FHTT is also coupled to). As shown, each PHY 230A-230C is coupled to a respective downstream port 240A-240C, which may be coupled to downstream devices (e.g., downstream HSIC devices within a same device as the USB hub 150).

Thus, in the embodiment of FIG. 2A, when both the upstream port and the downstream ports are high speed, the repeater paths may be utilized without any need for transaction translation using FHTTs 220A-220C. However, when the upstream port is operating at full speed, traffic may be routed through the full speed path from the hub logic to a corresponding FHTT. Thus, the PHY may support two high speed paths—one from the high speed repeater and one from the FHTT. In some embodiments, the FHTT path may be implemented as a standard UTMI interface. The high speed repeater path may be implemented in a serial manner. As indicated above, the downstream PHY may implement an HSIC downstream interface for power savings or a standard USB interface, as desired. In further embodiments, rather than including a respective FHTT for each PHY, a single FHTT may be shared among a plurality of (e.g., all of the) PHYs of the USB hub 150.

The internal hub 210 shown in FIG. 2A may be implemented as an internal USB hub (e.g., designed as a chip and included in the USB hub 150), it may be implemented in other manners as well. For example, the internal hub block of FIG. 2A may simply represent circuitry that implements standard USB hub functionality and not each and every part required in a standard hub. For example, PHYs of a standard hub may not be necessary within the USB hub 150 since high speed PHYs 230A-230C are already present. Thus, the internal hub 210 of FIG. 2A may represent an actual internal hub or simply internal hub functionality (e.g., for the sake of efficiency in depiction).

FIG. 2B illustrates an alternate embodiment where the FHTTs are implemented between the downstream ports of the internal hub and the downstream devices coupled to the internal hub. In this embodiment, the internal hub 210 (or circuitry implementing standard USB hub functionality) may be coupled to FHTTs at each downstream port. Accordingly, downstream devices may be coupled to each FHTT. In this embodiment, each FHTT 220A-220C may act as pass through circuitry when a corresponding downstream port is operating at high speed and may act as transaction translators when the corresponding downstream port is operating at full speed (or lower than high speed). Thus, in the embodiment of FIG. 2B, the FHTTs may be implemented outside of a USB hub, but still provide the desired functionality for each downstream device.

Figure 3:
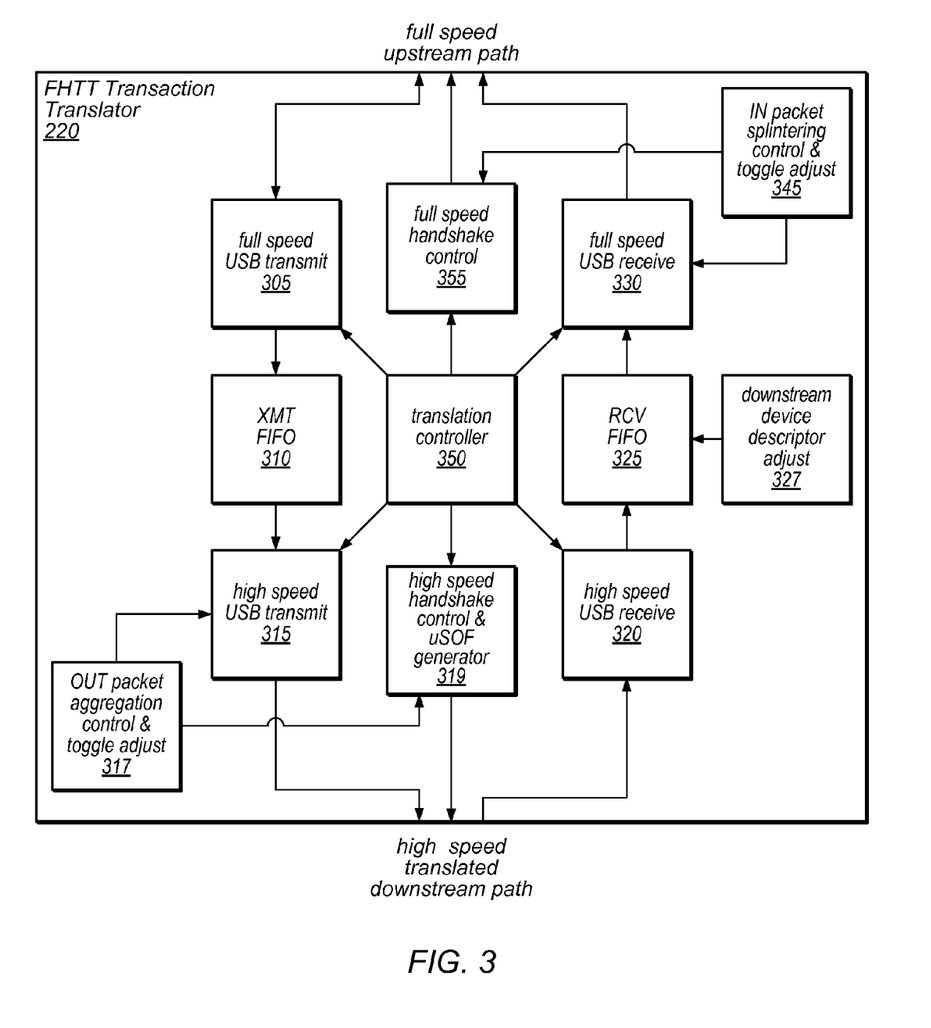
FIG. 3 is a block diagram of an exemplary transaction translator, according to one embodiment.

FIG. 3—Exemplary Transaction Translator

FIG. 3 illustrates a block diagram of an exemplary transaction translator 220. As shown, data from the upstream path may be stored in the transmit FIFO 310 at a full-speed rate by the full speed USB transmit logic 305. Data may be accumulated until interaction is required from a downstream device. The translation controller 350 may monitor whether interaction is required and then signal the high speed USB transmit logic 315 to pull data from the transmit FIFO 310 at the high speed rate. Similar behavior may occur in the reverse direction for high speed USB receive logic 320, receive FIFO 325, and full speed USB receive logic 330. However, other kinds of buffers and implementations are envisioned.

In addition, the translation controller 350 may further control full speed handshake control block 355 (coupled to the full speed upstream path) as well as high speed handshake control & uSOF generator 319 (coupled to the high speed downstream path). Further, block 317 may control out packet aggregation (as well as toggle adjustment) of the high speed USB transmit block 315 and high speed handshake control block 319. Similarly, block 345 may control in packet splintering and toggle adjustment of the full speed handshake control 355 and full speed USB receive 330. Finally, block 327 may adjust downstream device descriptors for receive FIFO 325.

Further exemplary embodiments regarding the transaction translator are provided below.

Figure 4:
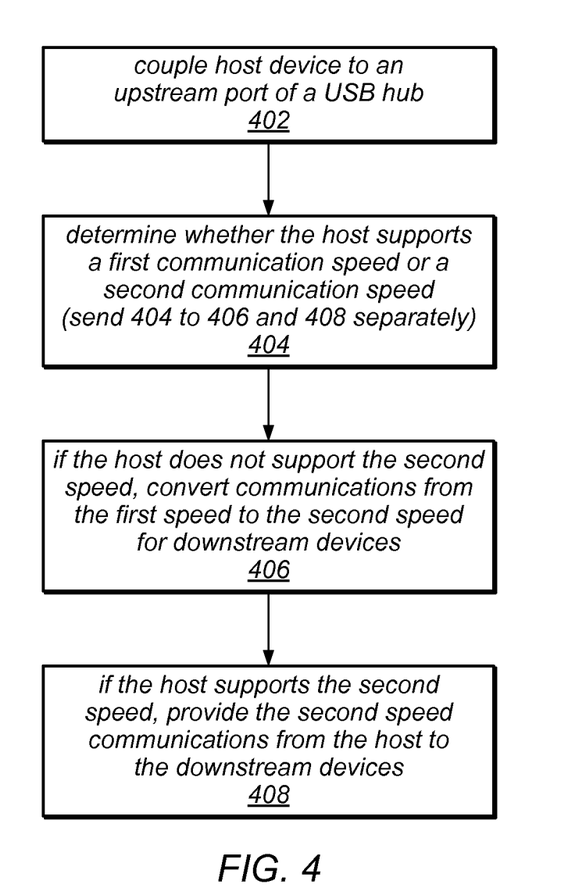
FIG. 4 is a flowchart diagram illustrating an embodiment of a method for supporting high speed devices with a lower speed host.

FIG. 4—Supporting Lower Speed Hosts and High Speed Downstream Devices

FIG. 4 illustrates a method supporting high speed devices with a lower speed host. The method shown in FIG. 4 may be used in conjunction with any of the systems or devices described herein, among other devices. In various embodiments, some of the method elements shown may be performed concurrently, in a different order than shown, or may be omitted. Additional method elements may also be performed as desired. As shown, this method may operate as follows.

Initially, in 402, a host (e.g., the host 100) may couple to an upstream port of a USB hub (e.g., USB hub 150). For example, a computer system may be coupled to an external USB hub (e.g., as in FIG. 1A) or may be coupled to a device (e.g., a portable device) which includes an embedded USB hub (e.g., as in FIG. 1B). The USB hub may be implemented according to the embodiments of FIG. 2A or 2B (among other possibilities). As indicated above, the USB hub may be configured to operate with hosts that support any of various USB speeds (e.g., low speed, full speed, high speed, super speed, etc.). Additionally, the USB hub may be configured to operate with downstream devices that support various USB speeds as well; however, some of the devices may only be configured to support higher USB speeds (e.g., high speed). For example, some of the devices may be embedded devices (e.g., embedded in the USB hub or embedded in a device with the USB device) which are high speed inter-chip (HSIC) devices that are unable to support lower speeds (e.g., full speed or low speed).

In embodiments described herein, a "first speed" and a "second speed" are used, where the second speed is faster than the first speed. The second speed may be, for example, USB high speed, and the first speed may be, for example, USB full speed, but other combinations are envisioned. For example, any combination where the host operates at a lower speed than the downstream device is envisioned.

Accordingly, in 404, the method (e.g., the USB hub) may determine what communication speed the host supports (e.g., the first speed or the second speed). For example, the communication speed may be determined during an enumeration process of the host and the USB hub.

In 406, where the host does not support the second speed, communications from the host may be converted from the first speed to the second speed (e.g., by a first speed to second speed transaction translator) and then provided to one or more downstream devices (e.g., via a second speed PHY). Note that the transaction translator (TT) may be comprised within the USB hub or may be outside of the USB hub, as desired. For example, the TT may be interposed between the second speed PHY and the host (e.g., as in FIG. 2A), or may simply convert communications from the USB hub for the downstream device when the USB hub provides first speed communications (e.g., as in FIG. 2B).

However, in 408, where the host supports the second speed, the communications may be passed through from the host to the downstream device at the second speed.

Exemplary Details Regarding Operation of the Transaction Translator

The following provides further details regarding various embodiments of the operation of the transaction translator/conversion of the full speed communication to high speed. The descriptions below are provided as exemplary only and do not limit the transaction translators or methods described above. Additionally, the methods described below may be modified according to the variations already discussed above (e.g., with respect to different supported speeds, variations in implementations, etc.).

FHTT Limitations

Because bandwidth supported by a full speed host is only a fraction of the bandwidth supported by a high speed device, the system is limited by that capability of the full speed host. Some high speed devices may require a higher bandwidth to provide full functionality (for example, a high resolution web camera) and the FHTT is not intended to and may not be able to overcome this system limitation. The application associated with the device (e.g., executing on the host) should be developed with this consideration in mind when operating in full speed mode.

Two Ways to Complete Transfers

The descriptions below address two exemplary methods to complete transfers between the full speed domain to the high speed domain. The store and forward approach is potentially simpler to implement, especially with existing design components, but may not work well with all drivers and applications. The concurrent transfer approach provides more efficient bus utilization and supports isochronous IN transfer packets.

Store and Forward Approach

The store and forward approach accepts an entire packet on one speed domain into a FIFO and checks to ensure it is a good packet before beginning to forward the packet on the other speed domain. This type of approach may allow for better re-use of existing building blocks such as a USB host controller and a USB device controller with a shared buffer between them.

Because this approach waits for completion of the packet on one speed domain before starting the packet transfer on the other speed domain, additional latency results. The additional latency makes it impossible to meet upstream bus timeout requirements for longer IN type packets.

To work around the bus timeout constraint, the FHTT can NAK an IN token from the host on the full speed domain, while it forwards the IN token to the device and then receives the data. When the host re-tries the IN transfer at a later time the data will be available because the high speed transfer will have completed. Because isochronous transfers do not support a NAK response, the store and forward approach may not be compatible with longer isochronous IN transfers.

Additionally, because transfers to and from different endpoints can be interleaved, separate FIFOs may be required for each individual IN endpoint so that data from multiple endpoints can be stored waiting for the host retry.

Some applications may not work well with this type of approach. For example, a NAK on an interrupt endpoint may be interpreted as no interrupt data by the host application and the transfer may be retired with no attempt by the host to re-read the data until the next polling interval. This may make the data returned always stale by the polling interval. As another example, a NAK on a bulk endpoint may cause the host scheduler to stop requesting additional packets until the next frame, which could impact throughput.

Concurrent Transfer Approach

The concurrent transfer approach starts the transfer on the target speed domain while the packet is still being received on the source speed domain.

This type of approach is more complex because it calculates and predicts when to initiate the transfer on the target domain while the transfer on source domain is still in progress. If the transfer is initiated too early, the method may run out of data on the target speed domain while it is still being transferred from the source speed domain. If the transfer is initiated too late, the method may violate the bus timeout latency requirements. Additionally, the method may also attempt to faithfully replicate any error conditions into the target domain that is observed in the source domain.

However, this approach most faithfully reproduces the traffic pattern expected by the device and the application because it does not rely on a false retry. The method also does not require multiple FIFOs for different IN endpoints.

From the full speed host perspective, a full speed device is budgeted with 625 ns (7.5 full speed bit times) towards bus timeout from the start of a transfer.

From the FHTT perspective the high speed device is budgeted with 400 ns (192 high speed bit times) towards bus timeout from the start of a transfer.

The additional time to re-transmit at token at a high speed rate is 32 bits high speed sync
8 bit PID
11 bit address/endpoint
5 bit CRC
8 bit EOP 64 bit times = 134 ns This allows the FHTT 625 ns−400 ns−134 ns=91 ns of additional latency which can be allocated to either start the high speed token after receiving the end of the full speed token, or to start the full speed IN data packet to the host after receiving the start of the high speed IN data packet from the device. If the FHTT is used in a system where the number of hubs is limited and can be firmly controlled (such as within an embedded system), an additional 140 ns of roundtrip delay time per eliminated hub (up to 560 ns total for 4 eliminated hubs) is also available if additional latency is required. The $5^{th}$ hub level retains its full 140 ns roundtrip timing budget where the FHTT is embedded within a hub.

Additional latency can be supported if the FHTT starts its full speed sync sequence back to the host concurrently while it forwards the token to the high speed device. The 8-bit full speed sync sequence will take 666 ns to complete, which is longer than the 534 ns total time it will take to forward the token to the high speed device (134 ns) and for the device to respond (400 ns). By the time data or a handshake is required to be transmitted upstream to the full speed host, the FHTT will have information from the start of the high speed transfer and can differentiate between a data packet (which has a PID which may need to be modified) and a handshake packet such as a NAK from the high speed device.

Packet Aggregation & Splintering

High speed packets may have different maximum packet sizes (MPS) than full speed packets. For example, bulk packets have a fixed MPS of 512 bytes in high speed, but have a MPS of 64 bytes (or less) in full speed. It is illegal to send a packet larger than the full speed MPS to a full speed host, so the FHTT may adjust the size of the packets appropriately.

Table Maximum Packet Sizes:

| Packet Type | Full Speed MPS | High Speed MPS |
| --- | --- | --- |
| Bulk | 64 (or 32, 16, 8) | 512 |
| Interrupt | 64 (or less) | 1024 (or less) |
| Control | 64 (or 32, 16, 8) | 64 |

OUT Packet Aggregation

The full speed host packets will always be equal to or smaller than the high speed device packets. USB allows packet sizes smaller than the MPS to be sent—this is defined in USB as a "short packet." The first solution to deal with differing MPS is to send each full speed host out packet as a short packet to the high speed device. Depending on the software application this may however cause issues since a short packet can be considered by some software applications as the end of a transfer.

Another solution to overcome the packet size problem is to aggregate multiple full speed out packets from the full speed host until either there is enough data to create a high speed packet, or a short packet is encountered. Once these conditions are encountered, the high speed out packet can be sent to the device.

While aggregating, the FHTT may keep track of the proper toggle bits for each speed domain and ensure the proper data token is passed (Data0 or Data1). At times, the PID received on one speed domain may need to be modified/toggled before forwarding the packet onto the other domain.

When aggregating isochronous or interrupt transfers, the polling rate on the full speed side may be adjusted to ensure the same amount of data is transferred in a given 1 ms frame. For example, an interrupt endpoint with high speed MPS=512 and polling rate of 64 microframes might be aggregated from eight full speed packets with MPS=64. To transfer the same amount of data at the same rate, the polling rate would need to be changed first from 64 to 8 to adjust for 1 ms full speed frames from 125 us micro-frames. It then would be changed from 8 to 1 to adjust for the need to complete 8 full speed packets with MPS=64 to transfer the same amount of data as the high speed packet with 512 bytes.

IN Packet Splintering

The high speed device packets will always be equal to or larger than the full speed IN packets which the host can accept. Once a packet is received into the receive FIFO, the FHTT may use that data to create one packet or a series of full speed out packets to the full speed host until the data is consumed. Because the high speed data is not immediately forwarded to the full speed Host, the FHTT may generate an ACK to the high speed device on it own.

While splintering, the FHTT may keep track of the proper toggle bits for each speed domain and insure the proper Data token is passed (Data0 or Data1). At times, the PID received on one speed domain will need to be modified/toggled before forwarding the packet onto the other domain.

When splintering isochronous or interrupt transfers, the polling rate on the full speed side must be adjusted to insure the same amount of data is transferred in a given 1 ms frame. For example, an interrupt endpoint with high speed MPS=512 and polling rate of 64 microframes might be splintered into eight full speed packets with MPS=64. To transfer the same amount of data at the same rate the polling rate would need to be changed first from 64 to 8 to adjust for 1 ms full speed frames from 125 us micro-frames. It then would be changed from 8 to 1 to adjust for the need to complete 8 full speed packets with MPS=64 to transfer the same amount of data as the high speed packet with 512 bytes.

OUT Transfers

Out transfers may involve a transfer of an initial token from the upstream host to the downstream device, followed by data from the upstream host to the downstream device, sometimes with a handshake from the downstream device back to the host.

If an OUT packet is sent from the full speed host before there is room in the transmit FIFO for another packet, the FHTT may respond to the full speed host with a NAK response (except for the case of a SETUP packet which may always respond with an ACK and a Isochronous packet which includes no handshake).

Interrupt OUT Transfers

Store & Forward Approach: The FHTT may accept a full speed interrupt OUT packet into the transmit FIFO and generate an ACK back to the full speed host. For cases where full speed MPS<high speed MPS, it may aggregate multiple full speed interrupt OUT packets, or forward them as short packets. Once enough data is received for the high speed packet, the FHTT will attempt to transfer a packet to the high speed device. If the device responds with a NAK or an Error, the packet transfer may be repeated until successful.

Concurrent Transfer Approach: The FHTT may accept a full speed interrupt OUT packet into the transmit FIFO. For cases where full speed MPS<high speed MPS, it may aggregate multiple full speed interrupt OUT packets, or forward them as short packets. Once a sufficient portion of the packet is received relative to the high speed MPS, the FHTT may start forwarding the packet to the high speed device and also start the full speed sync portion back to the full speed host for the handshake packet and then follow up with the response it receives from the high speed device.

Bulk OUT Transfers

Store & Forward Approach: The FHTT may accept a full speed bulk OUT packet into the transmit FIFO and generate an ACK back to the full speed host. Since full speed MPS<high speed MPS, it may aggregate multiple full speed interrupt OUT packets, or forward them as short packets. Once enough data is received for the high speed packet, the FHTT may attempt to transfer a packet to the high speed device. If the device responds with a NAK or an Error, the packet transfer will be repeated until successful.

Concurrent Transfer Approach: Since full speed MPS (64 Bytes)<high speed MPS (512 Bytes), it may aggregate multiple full speed interrupt OUT packets, or forward them as short packets.

Control OUT Transfers

Store & Forward Approach: The FHTT may accept a full speed control OUT packet into the transmit FIFO and generate an ACK back to the full speed Host. The full speed MPS can be set to support the same MPS as the high speed MPS so no aggregation is required. The FHTT may attempt to transfer the packet to the high speed device. If the device responds with a NAK or an Error, the packet transfer will be repeated until successful.

Concurrent Transfer Approach: Since full speed MPS (64 Bytes)=high speed MPS (64 Bytes) no aggregation is required.

Isochronous OUT Transfers

Store & Forward Approach: The FHTT may accept a full speed isochronous OUT packet into the transmit FIFO. For cases where full speed MPS<high speed MPS it may aggregate multiple full speed interrupt OUT packets, or forward them as short packets. Once enough data is received for the high speed packet, the FHTT may transfer a packet to the high speed device. There may be no handshake for isochronous transfers.

Concurrent Transfer Approach: full speed MPS=high speed MPS for all sizes besides 1024 Bytes. If a device with 1024 Byte packet must be supported, aggregating two packets may be required.

IN Transfers

IN transfers involve a transfer of an initial token from the upstream host to the downstream device, followed by data from the downstream device back to the host, sometimes followed by a handshake from the host back to the downstream device.

With the store and forward approach, if an IN token is sent from the full speed host before there is data in the receive FIFO for another packet, the FHTT will respond to the full speed host with a NAK response (except for the case of an Isochronous packet which is not supported). It will forward the IN token to the high speed device and then receive the data from the high speed device into the receive FIFO and generate an ACK response to the device. On subsequent IN transfers from this endpoint, the FHTT will draw data from the receive FIFO and pass to the full speed host until the FIFO is drained.

With the concurrent transfer approach, an IN token will be received from the full speed host and then forwarded to the high speed device. The FHTT will start the response back to the full speed host with the sync pattern portion of the transfer, and continue with actual packet it receives from the high speed device (whether it is data or a handshake.) Due to the difference in transfer rates, the start of the high speed packet may be received by the FHTT before the sync pattern to the full speed host is completed so the packet may appear to the full speed host as seamless.

The FHTT may reply to the high speed device with an ACK before receiving a full handshake packet from the full speed host because high speed bus timeout constraints preclude waiting long enough for the full speed host response to propagate. If the full speed host responds with anything other than an ACK response, the data may be retransmitted from the receive FIFO to the full speed host when the full speed host attempts a retry. The data cannot be received directly from the high speed device because it was already given an ACK handshake and flushed the data from its queue.

In both cases, the FHTT may be able to identify and properly forward "Zero" packets since these are a necessary part of the USB protocol, especially for control transfers.

Interrupt IN Transfers

Store & Forward Approach: The FHTT may accept a full speed interrupt IN token into the FIFO and generate a NAK response back to the full speed Host. It may forward the IN token to the high speed device. It may receive IN data to its receive FIFO. When the host performs a retry for the transfer, the FHTT may return the data for that endpoint which it has stored in the receive FIFO. For cases where full speed MPS<high speed MPS, it may splinter the data from the larger high speed IN data packet across multiple full speed interrupt IN packets without further interaction with the high speed device. Once all the data is drained from the receive FIFO for this endpoint, the process may repeat and the FHTT may forward the next IN token to the high speed device. If the host responds with anything other than an ACK handshake, the transfer of the same packet may be repeated by the FHTT on the next IN transfer to that endpoint until successful.

Concurrent Transfer Approach: For cases where full speed MPS (64 Bytes)<high speed MPS (up to 1024 Bytes), it may splinter the larger high speed packet into multiple full speed interrupt IN packets.

Bulk IN Transfers

Store & Forward Approach: The FHTT may accept a full speed bulk IN token into the FIFO and generate a NAK response back to the full speed host. It may forward the IN token to the high speed device. It may receive IN data to its receive FIFO. When the host performs a retry for the transfer, the FHTT may return the data for that endpoint which it has stored in the receive FIFO. For cases where full speed MPS<high speed MPS, it may splinter the data from the larger high speed IN data packet across multiple full speed interrupt IN packets without further interaction with the high speed device. Once all the data is drained from the receive FIFO for this endpoint, the process may repeat and the FHTT may forward the next IN token to the high speed device. If the device responds with a NAK or an Error, the packet transfer may be repeated until successful.

Concurrent Transfer Approach: Since full speed MPS<high speed MPS it may splinter multiple 64 byte full speed bulk OUT packets from the 512 Byte high speed bulk out packet.

Control IN Transfers

Store & Forward Approach: The FHTT may accept a full speed control OUT packet into the transmit FIFO. The full speed MPS can be set to support the same MPS as the high speed MPS so no aggregation is required. The FHTT may attempt to transfer the packet to the high speed device. If the device responds with a NAK or an Error, the packet transfer may be repeated until successful.

Concurrent Transfer Approach: Because full speed MPS=high speed MPS, no splintering is required and packets may be directly forwarded from the high speed Device to the full speed Host.

Isochronous IN Transfers

Store & Forward Approach: Isochronous transfers do not support a handshake response, data must be returned immediately following the token. There may not be sufficient time to forward a token to the downstream device and receive a full packet of data from the downstream device to forward upstream within the turnaround time requirements from the token to the data with the store and forward approach.

The techniques used for other IN transfers involving a NAK response and retry may not be suitable for isochronous packets because these types of transfers do not support retry.

For small packets (less than or equal to 13 bytes for a maximum hub topology, or 30 Bytes for a single hub topology), the store & forward approach may be able to receive the full isochronous IN packet into the receive FIFO and then start the transfer to the full speed host within the bus timeout limitation.

Concurrent Transfer Approach: The FHTT may accept a full speed isochronous IN token into the FIFO. The FHTT may then forward the token to the high speed device. As the data from the high speed device starts to be received into the receive FIFO, it may immediately start the transfer back to the full speed host without waiting for the end of transfer from the high speed device. Because of the different in data rates, the rest of the high speed packet may be received into the receive FIFO before the FHTT completes sending the data to the full speed host. There is no handshake required on Isochronous transfers so this will complete the transfer.

Downstream Descriptors

The FHTT may represent a legal full speed device connected on its downstream port to the upstream full speed host. It can forward much of the descriptor information directly from the high speed device to the full speed host, but some aspects may be modified to maintain a definition consistent with a legal full speed host.

Endpoint Descriptors

The FHTT may translate the MPS from the high speed device to a legal setting for full speed. For Bulk this means replacing MPS from 512 to a setting of 64. For interrupt, MPS may be replaced from any size over 64 bytes to the maximum setting of 64 bytes.

Any high bandwidth settings for interrupt or isochronous endpoints may be removed.

The polling interval for interrupt endpoints may be adjusted first by dividing by 8 so that the setting matches 1 ms frames instead of 125 us micro-frames. If aggregating or splintering packets is required because the high speed Device has a MPS larger than full speed MPS=64, it may be further reduced by the aggregating or splintering factor to insure enough additional smaller full speed packets are added to transport the equivalent data from the larger high speed packets. If the result is smaller than one, then the bandwidth supported by the high speed device cannot be supported by the full speed host, and the polling interval can be set to the minimum value of 1.

Device Qualifier

The device qualifier descriptor that describes how the high speed device would operate in full speed mode may be removed and not returned in response to a GET_CONFIGU-RATNO request by the full speed host.

USB Version

The USB Version may be changed from 0200 to 0110.

High Speed High Bandwidth Isochronous and Interrupt Endpoints

High speed devices may support high bandwidth endpoints, which means that they support multiple packets during the same 125 us micro-frame. Full speed hosts do not support high bandwidth endpoints. Even if a device supports high bandwidth endpoints, the host has the option of sending fewer packets within a micro-frame. The FHTT can therefore forward packets as received from the full speed host without making use of the high bandwidth feature on the high speed device.

For example, an IN transaction may accumulate the token then the transaction controller would direct the high speed USB transmit logic to forward the token to the downstream PHY and out to the device. An OUT transaction would cause the full speed USB transmit logic to accumulate the token and all data associated with the packet. Once completed the translation controller would cause the high speed USB transmit logic to forward the token and the data from the transmit FIFO and through the downstream PHY and out to the device.

Similar logic on the receive side would store the high speed data (for IN packets) or handshake (for OUT packets) into the receive FIFO. Once the completed, the translation controller would cause the full speed USB receive logic to pull data from the receive FIFO at a full speed rate and forward it to the upstream path and out to the connector and USB host.

For IN packets the host handshake would flow through the transmit FIFO using the same type of sequence.

The translation controller may also have responsibility to assemble and generate micro-start-of-frame packets at 125 us intervals with data based on the last full speed start of frame sent by the SOC. The uSOF packets would be sent to the high speed USB transmit logic to be forwarded to the PHY and out to the device.

In addition to data transfers, it may the responsibility of the translation controller to communicate with the standard hub logic to insure proper operation of the high speed PHY for events such as the chirp handshake, suspend, resume, remote wakeup and other signaling which are not data based and could differ between high speed and full speed signal environments.

Note that in embodiments described above, the various FIFOs (e.g., the transmit FIFO) may be configured to store tokens as well as data packets. However, in alternate embodiments, there may be separate token FIFOs, as desired.

Advantages of Embodiments Describe Above

The embodiments described above may particularly be beneficial for HSIC downstream devices. In these embodiments, these embodiments may enable HSIC downstream ports on a hub to operate properly even if the upstream port is operating at full speed and allow the customer to achieve power savings associated with HSIC.

An alternative benefit allows the hub to operate with a standard USB device which has a design defect which causes it to not operate properly in full-speed mode, or with USB devices which are more efficient at communicating more quickly in bursts rather than more slowly over a longer period of time.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. system, comprising:
at least one upstream port for coupling to a host;
at least one downstream port for coupling to at least one downstream device;
at least one transaction translator (TT) comprising one or more circuits and coupled to the at least one downstream port, wherein the one or more circuits are configured to:
split a communication received from the downstream device at the first speed into a plurality of packets when the host communicates at a second speed and does not support the first speed;
transmit an acknowledgment signal to the downstream device, wherein the acknowledgement signal is indicative of having received the communication and wherein the acknowledgment signal triggers an additional communication from the downstream device on the downstream port;
adjusting a toggle bit on at least one of the plurality of packets wherein the toggle bit is used by the host to confirm receipt of the plurality of packets;
adjusting a polling rate associated with the frequency of requests for communications from the downstream device; and
send the plurality of communications to the host device at a second speed wherein the second speed is slower than the first speed.

2. The system of claim 1, wherein the at least one upstream port, the at least one downstream port, and the at least one TT is comprised in a hub, wherein the hub is configured to operate at one or more of a USB full speed, a USB high speed, and a USB super speed.

3. The system of claim 1, wherein the at least one downstream device comprises a high speed inter-chip (HSIC) device.

4. The system of claim 1, further comprising:
at least one first speed physical interface (PHY), wherein the at least one TT is interposed between the at least one first speed PHY and the host, wherein the at least one TT is not used when the host supports the first speed.

5. The system of claim 1, further comprising:
an internal hub coupled to the at least one upstream port and the at least one TT; and
at least one first speed PHY, wherein at least one downstream port of the internal hub is coupled to the at least one first speed PHY and is separately coupled to the first speed PHY via the at least one TT;
wherein, when the host does not support the first speed, the at least one TT is configured to convert communications sent from the host via the at least one downstream port of the internal USB hub for the at least one first speed PHY;
wherein, when the host supports the first speed, internal hub is configured to provide the communications sent from the host to the first speed PHY without the at least one TT.

6. The system of claim 1. wherein, when the host supports the first speed, the at least one TT is configured to pass through communications sent from the host at the first speed to the downstream device.

7. The system of claim 1, wherein the second speed comprises USB full speed.

8. The system or claim 1, wherein the first speed comprises USB high speed.

9. The system of claim 1, wherein the one or more circuits are further configured to:
- aggregate a plurality of communications sent from the host at the second speed; and
- send the aggregated communications to the downstream device at the first speed.

10. A method, comprising:
- determining whether a host supports a first speed or a second speed, wherein the first speed is higher than the second speed, wherein said determining is performed after connecting a hub apparatus to the host;
- if the host communicates at a second speed and does not support the first speed:
  - receiving a packet from a downstream device at the second speed;
  - splitting the communication received from the downstream device at the first speed into a plurality of packets;
  - sending a handshake signal to the downstream device wherein the handshake signal is indicative of having received the communication and wherein the handshake signal triggers an additional communication from the downstream device;
  - adjusting a toggle bit on at least one of the plurality of packets wherein the toggle bit is used by the host to confirm receipt of the plurality of packets;
  - adjusting a polling rate associated with the frequency of requests for packets from the downstream device; and
  - sending the packet to a downstream device at the first speed;
- if the host does support the first speed:
  - sending the packets to the downstream device at the first speed.

11. The method of claim 10, wherein said receiving, sending a handshake signal, adjusting, and sending the packet are performed by a second speed to first speed transaction translator.

12. The method of claim 10, wherein the host comprises a USB host configured to operate at a USB full speed and wherein the downstream device comprises a USB device configured to operate at a USB high speed.

13. The method of claim 10, wherein the downstream device comprises a high speed inter-chip (HSIC) device.

14. The method of claim 10, wherein said determining is performed by a hub configured to operate at one or more of a USB full speed, a USB high speed, and/or a USB super speed.

15. The method of claim 14, wherein the downstream device and the hub are comprised in a common device.

16. The method of claim 10, wherein the second speed comprises USB full speed, wherein the first speed comprises USB high speed.

17. The method of claim 10, wherein said sending the packet is performed by a first speed physical interface (PHY).

18. The method of claim 10, wherein said adjusting is performed by a second speed to first speed transaction translator (TT), wherein said sending the packet is performed by a first speed PHY, wherein the second speed to first speed TT is interposed between the host and the first speed PHY.

19. The method of claim 10, further comprising:
- receiving a packet from the downstream device;
- splitting the packet into a plurality of smaller packets; and
- sending the plurality of smaller packets to the host device at the second speed.

* * * * *